May 10, 1955     J. C. VICKLAND     2,708,007

ELECTRODE POSITIONING GRIDS

Filed March 27, 1952

PLAN SHOWING GRID ASSEMBLY COVERING ONE COLLECTOR TUBE DRAWER

JOHN C. VICKLAND
INVENTOR.

BY
ATTORNEY

United States Patent Office 2,708,007
Patented May 10, 1955

2,708,007

ELECTRODE POSITIONING GRIDS

John C. Vickland, Wellsville, N. Y., assignor, by mesne assignments, to Apra Precipitator Corporation, New York, N. Y., a corporation of Delaware Application March 27, 1952, Serial No. 278,877

5 Claims. (Cl. 183—7)

This invention relates to electrical precipitation means for removing suspended foreign particles from a moving gas stream.

The operation of electrical precipitation briefly consists in passing gas which contains suspended foreign particles through a strong electric field between centrally located discharge electrodes and outer grounded collector surfaces. The suspended particles become electrically charged and then move, under the influence of the strong electric field, to the outer grounded collector surfaces.

In such a precipitator, the spacing between the electrodes and the collecting surfaces is very critical since the strength of the field created, and consequently the efficiency of dust collection depends upon the constant spacing between the high voltage discharge electrodes and the grounded collector surfaces. If any one portion of the high voltage electrode is closer to the grounded surface than any other portion there will tend to be a "flashover" at a lower voltage, thus limiting the strength of the field.

The primary object of this invention is therefore to provide a means which will automatically and in a single step center each electrode with respect to its surrounding collector surface by accurately superposing an upper and a lower grid section on an intervening collector surface.

A further object of this invention is to provide a grid centering device which will reduce to a minimum its resistance to the passage of gas, steam or other cleaning fluid.

The above and further objects of this invention will become more apparent and in part pointed out by the following detailed description taken in conjunction with the accompanying drawings.

Figure 2:
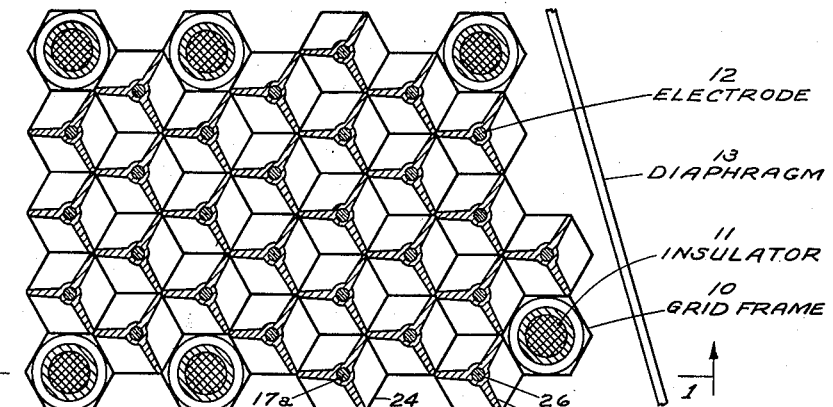

In the drawing Figure 2 is a plan view of the positioning devices used in the invention.

Figure 1:
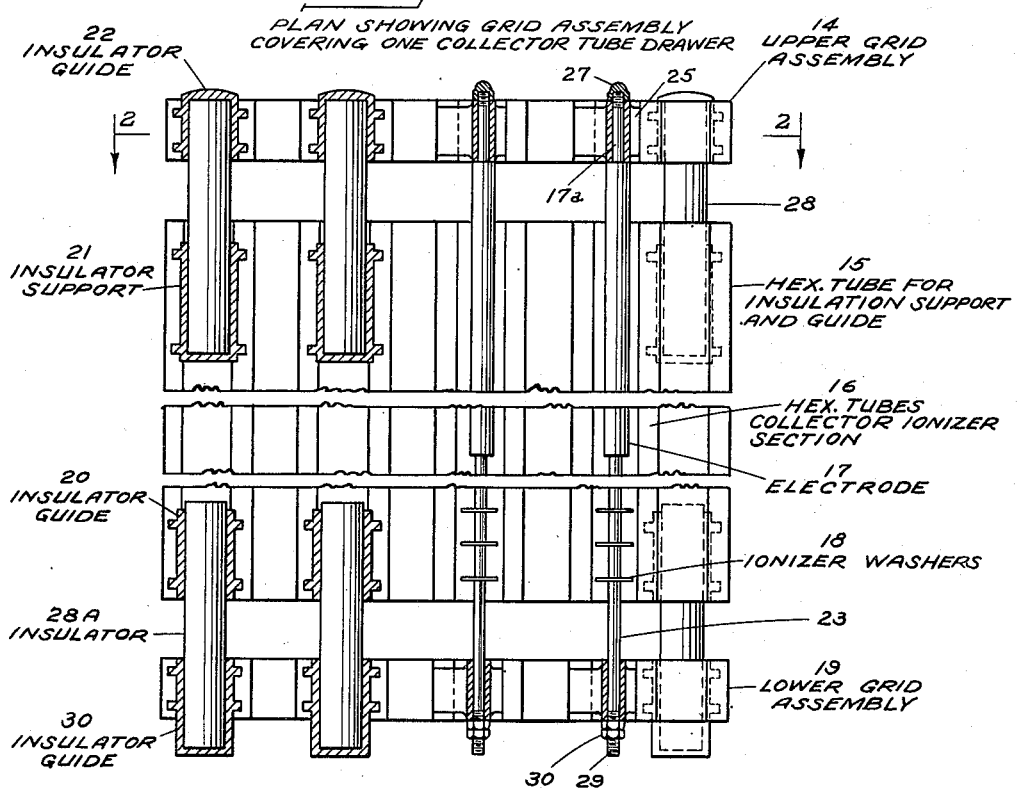

Figure 1 is a side elevation in section showing the electrodes centered within the collector tubes.

The main framework of the upper and lower grid assemblies 14 and 19 is composed of a number of hexagonal tube sections 24 rigidly joined together to form a grid assembly having the same cross sectional arrangement as the hexagonal collector tubes of the collector tube bank 16. Such a grid assembly might be made by cutting off a relatively thin transverse section from the collector tube bank.

Inside each hexagonal tube of the upper and lower grid assemblies 14, 19 is located a triple fingered web 25 that functions as the electrode positioner. These electrode positioners 25 are welded or otherwise rigidly joined to their surrounding tubes 24 at the distal ends of the web fingers.

Centrally of each positioner 25 is an opening 26 through which a necked down portion 17a of each electrode is projected. The electrodes 17 are secured to the three fingered upper and lower electrode positioners 25 in the upper and lower grid assemblies by nuts 27 or other conventional attaching means. At the lower or inlet end of each electrode 17 said necked down portion is extended as at 23 and carries the ionizer electrodes 18 in concentric relation thereto. Such ionizer electrodes are formed as thin metal discs or other surfaces having an edge of relatively small diameter. This necked down portion of the electrode together with its ionizing electrodes 18 comprises the discharge electrode. It is understood that such a discharge electrode facilitates corona discharge therefrom because it has a configuration which establishes a sufficiently high potential gradient at or near its surface to create a corona discharge before there is a disruptive discharge or spark over. For this purpose the discharge electrode usually takes the form of a member having a small surface area, such as a rod of small diameter provided with sharp edges or points. It has been found that the ionizer electrodes 18 joined to the small diameter rod 23 are especially effective in producing a high intensity electric field and corona discharge.

The upper portion of the electrode 17 known as the collecting electrode prevents a corona discharge therefrom. Said electrode has a radius of curvature which establishes a sufficiently low field concentration near its surface under the identical conditions which cause a corona discharge from the sharp edged ionizing electrodes 18.

At spaced locations in the upper grid assembly a plurality of cup shaped insulator guides 22 are joined to the inner surface of individual sections of hexagonal tube. These cup shaped insulator guides are so arranged that an open end faces the collector tube section which carries a reversely facing insulator support 15. These insulator supports are securely joined to the hexagonal collector tube so as to form a rigid support for the insulator rods 28 which in turn support the upper grid assembly.

The lower grid assembly carries cup shaped insulator guides 30 which align with the insulator guides 20 located in the lower portion of the hexagonal collector tubes 16. Situated in each of the lower guides 30 is a cylindrical insulator member 28' which extends into each insulator guide 20.

It is readily seen that both the upper insulators 28 and the lower insulators 28A serve as guides to constantly maintain the upper and lower grid assemblies in line with the intervening collector tubes. Furthermore, there is maintained at all times an insulation barrier between the electrode assembly and the intervening collector tubes. Such insulator means are recited for purposes of description only and other means may be used equally well to support both upper and lower grid assemblies in an insulated relationship with the collector bank.

During operation of the precipitator, a stream of gas carrying suspended particles enters the inlet end which in the drawing is shown as the end at the lower portion of the apparatus. In other arrangements of the precipitator it is to be understood that the inlet end could be readily adapted to the top or one of the sides of the device.

As the gas stream flows upwardly in a direction generally parallel to the electrode surfaces, the suspended particles become electrostatically charged by the electrical discharge from the ionizing electrode 18. As the momentum of the moving gas stream carries the charged particles upwardly, the electrode 17 serves to repel said charged particles to the outer collector surface 16, where the particles agglomerate and are deposited thereon preparatory to their being removed in any convenient manner such as by rapping, scraping or blowing.

The electrode positioner has been described relative to its use with a bank of hexagonal collector tubes; however, such use is to be considered an example of its application and not a limitation of its use. The invention is limited only as set forth in the following claims.

What I claim is:

1. An electrostatic precipitator comprising; a bank of parallel collecting elements interposed between grid assemblies having the same cross sectional configuration as said collecting elements; a series of discharge electrodes extending from one grid assembly to the other; means fixed in each grid assembly to positively position each electrode with respect to its cooperating collecting element; and a plurality of insulator members supported in said bank of collecting elements maintaining the grid assemblies spaced therefrom.

2. An electrostatic precipitator comprising; a bank of hexagonal collecting tubes interposed between grid assemblies having the same cross sectional configuration; discharge electrodes extending from one grid assembly to the other; means centrally positioning each electrode through each grid assembly and the intervening bank of collector tubes; insulator means separating each of said grid assemblies from said collecting tube assembly, said insulator means being supported in peripheral tubes of said collecting tube bank.

3. An electrostatic precipitator comprising; a bank of parallel collecting tubes interposed between upper and lower grid assemblies having the same cross sectional configuration as said collecting tube bank; a plurality of discharge electrodes extending from the upper grid assembly centrally through the collecting tubes to the lower grid assembly; means in each grid assembly to positively center each electrode therein; a plurality of insulator members positioned in said collecting tubes adjacent the upper grid assembly supporting both grid assemblies; and a plurality of insulator members positioned in said collecting tubes adjacent the lower grid assembly to maintain said grid assembly in spaced alignment with both said tube bank and said upper grid.

4. An electrostatic precipitator as defined in claim 3 wherein insulator members supporting the grid assemblies rest in a plurality of cup shaped support means fixed in said collecting tubes and aligned with oppositely facing cup shaped insulator guides in said upper grid assembly.

5. An electrostatic precipitator as defined in claim 4 wherein the insulator members aligning the lower grid assembly rest in cup shaped insulator guides fixed in said lower grid assembly and aligned with sleeve like guide members in said collecting tube bank.

References Cited in the file of this patent

UNITED STATES PATENTS

| | | |
|---|---|---|
| 1,329,825 | Bradley | Feb. 3, 1920 |
| 1,393,712 | Steere et al. | Oct. 11, 1921 |
| 2,422,564 | Pegg | June 17, 1947 |